2,441,056

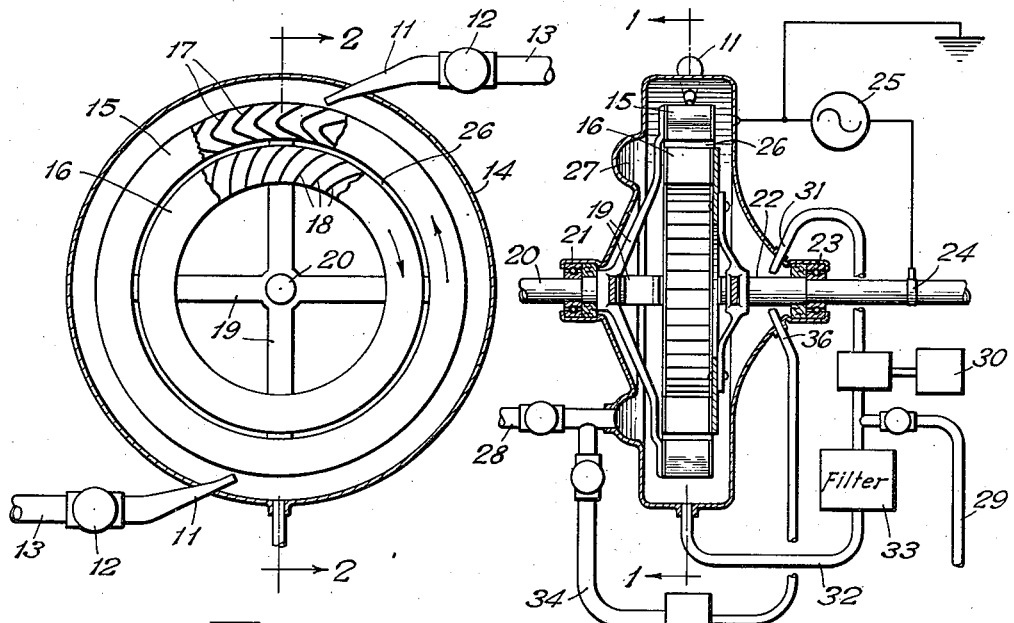
Fig. 1
Fig. 2
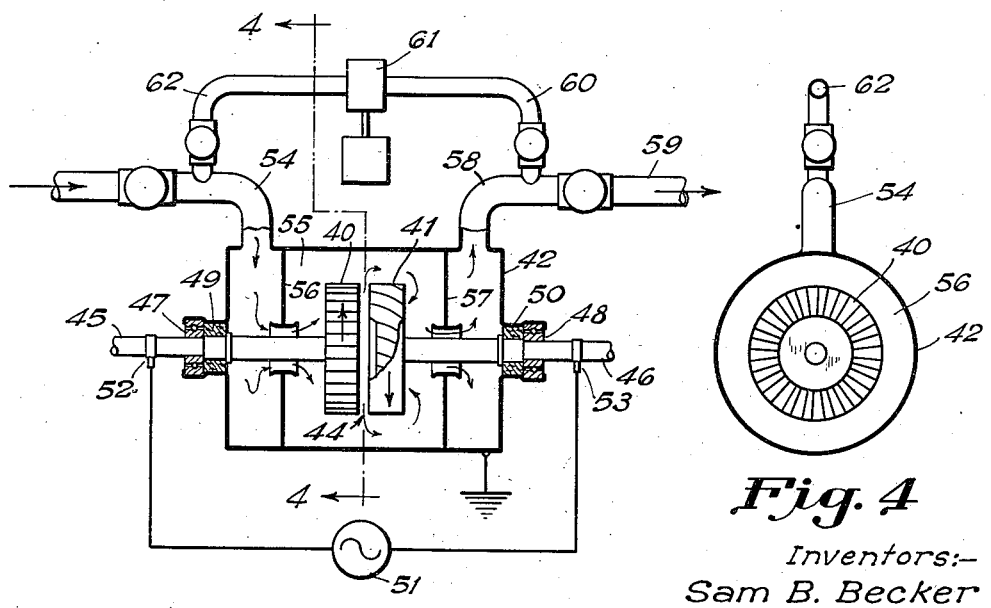
Fig. 3
Fig. 4
Inventors:—
Sam B. Becker
Paul F. Hawley
By Pike H. Sullivan
Attorney Patented May 4, 1948

UNITED STATES PATENT OFFICE 2,441,056

ELECTRIC ARC CONVERSION APPARATUS

Sam B. Becker and Paul F. Hawley, Chicago, Ill., assignors to Standard Oil Company, Chicago, Ill., a corporation of Indiana Application May 4, 1944, Serial No. 534,074

3 Claims. (Cl. 204—325)

This invention relates to apparatus for the chemical conversion of materials. More particularly, it is concerned with apparatus for the transformation of vaporous or gaseous materials in an electric arc.

The electric arc has long been recognized as a means for the chemical transformation of materials. Thus, it has been used for the conversion of atmospheric nitrogen to nitrogen oxides and for the conversion of normally liquid and normally gaseous hydrocarbons, e. g. the conversion of methane, ethane, propane, butane or feed stocks containing these hydrocarbons, e. g. natural gas, to produce acetylene, ethylene, propylene, etc., the polymerization of olefinic hydrocarbons, and the cracking of normally liquid hydrocarbons in the vapor phase.

However, electric arc converters and conversion processes have, in commercial practice, failed to achieve an important place primarily because of two outstanding problems. These problems are: how to achieve the substantially complete exposure of the feed stream to the electric arc without substantial by-passing, and how to control the temperature of the electrodes between which the arc is drawn.

It is an object of this invention to provide a novel electrical arc converter. Another object is to provide a novel conversion apparatus adapted to produce an annular electrical arc. Still another object is to provide means to control the electrode temperature in an electric arc converter while maintaining a continuous annular arc path. A further object of this invention is to provide improved processes for vapor phase conversion of materials in an electrical arc. Additional objects of this invention will become apparent as the description thereof proceeds.

Reference is made to the accompanying drawings which form a part of this specification and which are to be read in conjunction therewith. These drawings illustrate two preferred embodiments of the invention, but it is to be understood that these illustrations are not limitations upon the invention, which is best defined by the appended claims. In these drawings the same reference numeral in different figures represents the same or an equivalent part.

Figure 1 represents in diagrammatic form a side view of an arc converter in accordance with our invention, with certain parts shown broken away for clarity in representation.

Figure 2 is a diagrammatic view along the line 2—2 of Figure 1.

Figure 3 represents an alternative form of arc converter, largely in diagrammatic cross section.

Figure 4 represents a cross section of the arc converter shown in Figure 3, along the line 4—4.

Essentially the invention comprises a chamber containing at least two rotatably mounted cylindrical electrodes, one of the electrodes being insulated electrically from at least one other of the electrodes, the electrodes being so designed and constructed that when positioned adjacent each other in the chamber they define at least one substantially circular or annular arc zone in which there is a substantially uniform arc gap. These electrodes are rotated relative to each other, either by external prime movers, or by impellers built into the electrodes, or by both such means. Feed stock is admitted in the chamber through paths by means of which at least a major part of the feed stock passes in the vapor phase directly through the annular arc zone across which an electric arc is substantially continuously maintained, so that most of the feed stock is subjected to the discharge in the arc as it passes therethrough. Normally the impellers assist in directing the flow of this feed stock. The chamber is, of course, provided with means for removing conversion products therefrom.

We are acquainted with the fact that prior arc conversion processes have employed rotating electrodes, for example in United States Patent 1,887,658 issued to Howard S. Nutting et al. However, prior arc converters have been extremely inefficient, in that the arc has been struck between relatively small arcing surfaces so that the major part of the feed stock by-passes the arc which constitutes the true conversion zone. In general such arc converters have been either of the type in which there are two oppositely rotating cylindrical electrodes mounted end on, or there have been provided a plurality of projecting electrodes from a single rotor, opposite which are located a few stationary projecting electrodes. With this latter type of construction one fundamental difficulty which is experienced in most arc conversion methods is found; namely, that the electrode surfaces, particularly the stationary surfaces, become heated by the action of the arc to such a degree that rapid disintegration or erosion of the electrode follows. Moreover localized high temperatures result in excessive uncontrollable decomposition of the feed stocks, particularly if they contain hydrocarbons, and decomposition products are deposited upon the stationary electrode surfaces with resultant susceptibility to polarization and extreme instability of the arc. On the other hand, if rotating cylindrical electrodes are used as taught by the prior art, the arc is struck only in an extremely narrow zone which occupies not more than a few percent of the total periphery of the electrodes, thus resulting in low capacity apparatus.

On the other hand, essentially the rotating electrodes used in our converter define a toroidal arc path around the complete circumference of which the arc is substantially continuously maintained, and the oncoming gas is forced substantially completely through this arc, without the substantial by-passing encountered in the prior art. The electrodes can be maintained relatively cool due to the fact that they can be rotated in the gas stream itself.

Referring now more particularly to Figure 1, two nozzles 11 connected through valves 12 to a line 13 containing the feed stock to be converted, pass through the outer wall of the chamber 14. Within this chamber are two electrodes 15 and 16 which, as shown in Figures 1 and 2, are in the ordinary form of turbine rotors, one mounted within the other. These electrodes are formed with substantially impervious parallel side walls within which are mounted a plurality of impellers or vanes 17 and 18. The outer electrode 15 is mounted by means of a spider 19 on a shaft 20 which is journaled in a bearing 21 mounted in the walls of the chamber 14.

The inner electrode 18 is symmetrically mounted on a second shaft 22 coaxial with shaft 20. Shaft 22 is made of insulating material such as any of the present well known high strength insulating plastics. This shaft 22 is likewise rotatably mounted in a bearing 23 borne on the housing of chamber 14. Suitable conventional gas seals are employed on the chamber 14 outside of the bearings 21 and 23 to prevent escape of a substantial amount of gas along the mounting of the shafts. A conductor (not shown) electrically connects electrode 16 through the insulated shaft 22 to a slip ring 24 mounted on the shaft external to the chamber 14. An alternator 25 or other suitable source of arc voltage is connected to the case 14 (which in turn is grounded) and the slip ring 24, by means of which arc voltage is applied between the rotatable electrodes 15 and 16.

The gas passing in through nozzles 11 impinges upon the impellers 17 of the outer electrode 15, in part causing it to rotate in the direction shown by the arrow, and causing substantially all of this gas to be forced into the annular space or zone 26 between the inner and outer electrodes. It is to be noted that there is a substantially uniform distance between these electrodes 17 and 18 in this annular zone 26. This zone therefore forms the annular arc zone of the converter. The gas passing through this zone in part escapes from between the electrodes and in large part passes through and impinges upon the impellers or vanes 18 of the inner electrode 16, thereby assisting it to rotate in the opposite direction from that of electrode 15. In either case, the gas containing the converted products due to the action of the arc passes to an exit volute 27 from which it can be removed through a valved line 28. Since there is a substantially uniform arc gap throughout the annular zone 26 between the electrodes, the voltage due to the source 25 causes an arc to form substantially in a ring form throughout the entire annular volume, thus exposing practically all of the inlet vaporous feed stock to the action of the arc.

Either or both of the coaxial shafts 20 and 22 may be connected to prime movers which assist in rotating the electrodes in the desired direction. The combined action of the blast of gas passing through the electrodes and their rotation in the gas stream keeps the electrodes at a temperature far below that at which there is substantial accumulation of undesirable decomposition products. For example, if a hydrocarbon feed stock such as natural gas is employed, the combined action of the gas blast and the rotation of the electrodes serves to minimize the accumulation of solid carbonaceous material in this zone, for example in the form of carbon "trees," with resultant avoidance of short-circuiting of the apparatus which would necessitate frequent shutdowns.

Another important advantage of the equipment just described is that by the use of the impellers or vanes shown on the electrodes, which impellers or vanes 15, 16 and 40, 41 form continuous sinuous passages through the electrodes communicating directly with the annular arc zones 26 and 44 respectively, the gas is forced to take a predetermined sinuous path through and between the electrodes and, since the passages formed communicate with the annular arc zones at an oblique angle, the gas has a large tangential component of velocity, thus tending to maintain it in the arc zone for a greater length of time than would be true if it travelled solely in a radial direction. This tends to reverse the direction of the gas as it passes from one set of impellers to the other and gives a more complete conversion of raw feed stock into the desired products. This reversal also aids in the scrubbing action, tending to keep the electrode surfaces exposed to the arc both cool and clean.

It is also apparent that by the use of this equipment it is possible to treat substantially all of the incoming gas through the ring-like or annular arc with a minimum of by-passing and a maximum conversion per pass. However, it is occasionally advantageous to recirculate at least a part of the material removed from the arc converter, as will be subsequently described.

It is desirable to insure that any solid or liquid conversion product be prevented from settling on the portion of the shaft 22 within the chamber 14. We have shown two ways of avoiding this difficulty in Figure 2. If desired, a flushing liquid (for example, a liquid hydrocarbon such as kerosene, naphtha, virgin or cracked gas oil, high boiling aromatic hydrocarbons or the like) may be admitted through valved line 29 and pumped by pump 30 through one or more spray nozzles 31 upon the shaft 22 adjacent to the bearing 23 in a direction approximately parallel to the shaft 22, by means of which the shaft is bathed with the flushing liquid, and any accumulation of the conversion products is prevented or substantially minimized. The excess flushing liquid accumulates in the bottom of chamber 14 and is removed through line 32, preferably being passed through filter 33 and recirculated by pump 30. Additional flushing liquid is added through line 29 as needed.

On the other hand, both to clean shaft 22 and thus assist in preventing arcing at this point, and to recycle some of the material removed from the converter, a part of this removed material can be withdrawn from the exit volute 27 and passed through valved line 34, and impelled by pump 35 through nozzle 36 along shaft 22, preferably in a direction approximately parallel therewith. The gas blast due to this nozzle (of which there may be several), tends to avoid retention of solid or liquid particles on this shaft, thus maintaining its insulating properties. The material forced in through the nozzle 36 eventually passes through the arc region and is then again removed through the volute 27. It should be understood that we contemplate the simultaneous employment of liquid flushing and a gas blast to keep shaft 22 clean.

The flushing material, particularly in the case of hydrocarbon feed stocks, is preferably one having a relatively low vapor pressure, relatively high resistance to thermal decomposition, high electrical resistivity, and high solvent or dispersing power for carbonaceous residues such as are produced by excessive thermal decomposition of hydrocarbons. We contemplate that the flushing fluid entering through valved line 29 may have incorporated therein or be substantially composed of a detergent or dispersing material capable of dissolving or dispersing finely-divided metal and carbonaceous particles. For example, alkyl aryl sulfonates, such as dodecyl benzene sodium sulfonate, dialkyl esters of sodium sulfosuccinate, detergent compositions of the kind described in U. S. Patent 2,316,083 issued to C. M. Loane et al., or other known dispersing or detergent materials may be employed for this purpose.

The operating conditions, including peripheral velocities or relative velocities of the rotatable electrodes 15 and 16, the velocity of the entering material through nozzles 11, the arc temperature, the pressure within the vessel, and the rate of withdrawal of conversion products, necessarily influence the nature and extent of the reactions being effected in the arc converter. The operating conditions are not susceptible of precise definition except with respect to a particular feed stock when a particular product distribution is desired.

It is, of course, to be recognized that more than two nozzles 11 can be advantageously employed or that under some conditions only one nozzle may be necessary, and that the number and position of the vanes or impellers 17 and 18 may depend largely upon the conversion operation undertaken.

In Figure 3 another desirable form of arc converter is shown. In this case two cylindrical electrodes 40 and 41 are coaxially and rotatably mounted adjacent each other inside a chamber 42. As can be seen from the part of electrode 41 shown broken away, these electrodes preferably contain a plurality of vanes or impellers and are so constructed that the outer adjacent portions of the electrodes form a considerably narrower gap than that formed by the inner portions of the electrodes. This substantially circular gap 44 defines an annular arc zone. The cylindrical electrodes 40 and 41 are mounted on shafts 45 and 46 respectively, which are mounted on bearings 47 and 48, which in turn are mounted on insulating bushings 49 and 50, suitably insulating these shafts from the chamber 42. These shafts 45 and 46 may be connected by insulated couplings (not shown) to prime movers which tend to rotate the two electrodes in opposite directions. The impellers mounted within the rotating electrodes 40 and 41 assist in this rotation as will be subsequently discussed. An alternator 51 or other suitable source of arc voltage is connected through brushes 52 and 53 with the shafts 45 and 46 by means of which the arc voltage is applied across the arc gap 44 discussed above, thus causing a ring or annular arc to form in this zone.

The feed stock is admitted to the chamber through valved line 54. It is forced to pass into the space 55 adjacent the arc zone by a baffle 56 which causes the feed stock to flow in the direction shown by the arrows, adjacent to the bearing 47 and approximately parallel to the shaft 45. This feed stock entering this central space 55 close to the shaft 45 passes through the impellers mounted within the electrode 40 and is forced thereby into the annular arc zone 44 through which it passes outwardly with both a radial and a tangential component, thus maintaining it for a considerable length of path in the arc and serving simultaneously to cool the arc surfaces of electrode 40 and maintain them at a desirable relatively low temperature. The material which has passed outwardly from this zone, including the conversion products, passes in the direction shown by the arrow, a part of it passing through the opening in baffle 57, and a part passing back through electrode 41 due to the impellers contained therein, it thus being immediately recycled through the annular arc zone 44. The material which passes through the opening in baffle 57 is removed through line 58 and is withdrawn from the converter through line 58 and valved line 59.

If it is desired to recycle a part of the material leaving the arc converter, it is merely necessary to open the valve in line 60 and impel this material by means of pump 61 through valved line 62 back through line 54 into the converter.

It is seen that with this arrangement of equipment, substantially all of the vaporous feed stock entering line 54 is forced through the annular arc zone 44, thus giving a highly efficient arc conversion, while the blast of the gas passing through the two electrodes serves to keep these electrodes cool and clean.

Converted materials issuing from our arc converter may be subjected to one or more of a variety of operations resulting in the segregation or purification of conversion products from unconverted material suitable for recycle to the same or a different arc converter. Thus the converted material from our arc converter may be subjected to refrigeration, compression, absorption, filtration, fractional distillation, or similar operations for the segregation of carbonaceous or tarry materials, normally liquid materials and normally gaseous materials. The electric arc converters of our invention can be used singly, either on a once-through or recycle basis, or a plurality of converters may be used in series or parallel with or without product separation between the various conversion stages.

The direction and extent of the conversion within the annular arc can be influenced by the passage of catalytic materials with the vaporous feed through the conversion zone. A wide variety of catalysts is available for use, depending upon the specific conversion sought to be effected. Thus, hydrocarbon conversion may be influenced by the presence of such catalysts as the active halides, e. g. the halides of hydrogen, boron, zinc, tin, iron and the like. In addition the arc conversion can be influenced by the material of which the electrodes are composed, although customarily the electrodes are maintained at a sufficiently low temperature so that there is no substantial vaporization of this material. Suitable electrode materials include iron, aluminum, cobalt alloys, carbon, etc.

The arc converters of our invention will be found particularly advantageous for the conversion of light hydrocarbon gases, particularly when accompanied by a reactive gas such as oxygen, halogens or halogen acids, to produce partial oxidation, halogenation, or the like. Specifically the apparatus of our invention is well adapted for the production of unsaturated hydrocarbons, such as olefins, diolefins and acetylenes from light hydrocarbon gases. It may also be used for the efficient production of nitrogen oxides from atmospheric nitrogen.

We claim:

1. An electric arc conversion apparatus comprising a chamber, an outer ring electrode mounted in said chamber, an inner ring electrode concentrically mounted within said outer ring electrode whereby an annular arc zone with a continuous substantially uniform arc gap is formed between said electrodes, said electrodes being rotatable, said ring electrodes including a plurality of vanes forming radial passages extending through each of said electrodes and communicating with said annular arc zone, means for introducing a feed stock into said chamber adapted to direct at least a major portion of said feed stock through the passages of said outer electrode at a high velocity, said passages in said outer electrodes being so shaped as to direct the feed stock introduced therein through the annular arc zone and through the passages of said inner electrode and said passages of said rotatable electrodes being so shaped so as to produce rotation of said electrodes upon passage of the feed stock therethrough, means for removing conversion products from said chamber, means for electrically insulating one of said electrodes from the other, and means for applying electric arc voltage between said electrodes for producing a substantially continuous annular arc in said arc zone.

2. An electric arc conversion apparatus comprising a chamber, a first ring electrode mounted in said chamber, a second ring electrode mounted within said chamber whereby an annular arc zone with a continuous substantially uniform arc gap is formed between said electrodes, said electrodes being rotatable, said ring electrodes including a plurality of vanes forming passages extending through each of said electrodes and communicating with said annular arc zone, means for introducing a feed stock into said chamber adapted to direct at least a major portion of said feed stock through the passages of said first electrode at a high velocity, said passages in said first electrode being so shaped as to direct the feed stock introduced therein through the annular arc zone and through the passages of said second electrode, and said passages of said rotatable electrodes being so shaped as to produce rotation of said electrode upon passage of the feed stock therethrough, means for removing conversion products from said chamber, means for electrically insulating one of said electrodes from the other, and means for applying electric arc voltages between said electrodes for producing a substantially continuous annular arc in said arc zone.

3. An electric arc conversion apparatus comprising a chamber, a first ring electrode rotatably mounted in said chamber on a shaft, a second ring electrode mounted within said chamber rotatably carried by a second shaft coaxially arranged with the first named shaft whereby an annular arc zone with a continuous substantially uniform arc gap is formed between said electrodes, said ring electrodes including a plurality of vanes forming passages extending through each of said electrodes and communicating with said annular arc zone, means for introducing a feed stock into said chamber, means adapted to direct at least a major portion of said feed stock through the passages of said first ring electrode at a high velocity, said passages in said first ring electrode being so shaped as to direct the feed stock introduced therein through the annular arc zone and through the passages of said second ring electrode, said passages being so shaped as to produce rotation of said second electrode upon passage of the feed stock therethrough, means for removing conversion products from said chamber, means for electrically insulating one of said electrodes from the other, and means for applying electric arc voltage between said electrodes for producing a substantially continuous annular arc in said arc zone.

SAM B. BECKER.
PAUL F. HAWLEY.

REFERENCES CITED

The following references are of record in the file of this patent:

UNITED STATES PATENTS

| Number | Name | Date |
|---|---|---|
| 707,797 | Otto | Aug. 26, 1902 |
| 829,874 | Lovejoy | Aug. 28, 1906 |
| 1,051,131 | Lee | Jan. 21, 1913 |
| 1,316,445 | Island | Sept. 16, 1919 |
| 1,317,705 | Island | Oct. 7, 1919 |
| 1,336,939 | Barfoed | Apr. 13, 1920 |
| 1,887,658 | Nutting et al. | Nov. 15, 1932 |
| 1,931,800 | Jakosky et al. | Oct. 24, 1933 |
| 1,948,240 | Redd | Feb. 20, 1934 |
| 2,320,391 | Wakefield | June 1, 1943 |

FOREIGN PATENTS

| Number | Country | Date |
|---|---|---|
| 211,125 | Great Britain | June 2, 1925 |
| 331,315 | France | July 24, 1903 |
| 356,413 | Germany | July 19, 1922 |